United States Patent
Hong et al.

(10) Patent No.: US 7,613,148 B2
(45) Date of Patent: Nov. 3, 2009

(54) METHOD AND APPARATUS FOR PERFORMING FAST HANDOVER THROUGH FAST RANGING IN A BROADBAND WIRELESS COMMUNICATION SYSTEM

(75) Inventors: Seung-Eun Hong, Suwon-si (KR);
Bong-Gee Song, Seongnam-si (KR);
Kwang-Seop Eom, Seongnam-si (KR);
Min-Hee Cho, Anyang-si (KR);
Hyeong-Jong Ju, Seoul (KR)

(73) Assignee: Samsung Electronics Co., Ltd (KR)

(*) Notice: Subject to any disclaimer, the term of this patent is extended or adjusted under 35 U.S.C. 154(b) by 457 days.

(21) Appl. No.: 11/057,887

(22) Filed: Feb. 14, 2005

(65) Prior Publication Data
US 2005/0192011 A1 Sep. 1, 2005

(30) Foreign Application Priority Data
Feb. 13, 2004 (KR) .................. 10-2004-0009517

(51) Int. Cl.
*H04Q 7/00* (2006.01)
(52) U.S. Cl. ................ 370/331; 370/338; 455/439
(58) Field of Classification Search ......... 455/436–440, 455/442, 443, 446, 447; 370/328, 330, 331, 370/338, 329
See application file for complete search history.

(56) References Cited

U.S. PATENT DOCUMENTS

| | | | |
|---|---|---|---|
| 5,917,811 A | 6/1999 | Weaver, Jr. et al. | |
| 6,570,856 B1 | 5/2003 | Freeburg et al. | |
| 6,667,963 B1* | 12/2003 | Rantalainen et al. | 370/337 |
| 6,681,099 B1* | 1/2004 | Keranen et al. | 455/67.16 |
| 6,728,540 B1* | 4/2004 | DeSantis et al. | 455/437 |
| 7,295,531 B2* | 11/2007 | Wheatley et al. | 370/328 |
| 2003/0007471 A1* | 1/2003 | Terasawa et al. | 370/335 |
| 2003/0225892 A1* | 12/2003 | Takusagawa et al. | 709/227 |
| 2005/0083898 A1* | 4/2005 | Ohwada | 370/342 |

FOREIGN PATENT DOCUMENTS

| | | |
|---|---|---|
| CN | 1199298 | 11/1998 |
| JP | 04-245723 | 9/1992 |
| JP | 9-501805 | 2/1997 |
| JP | 9-504144 | 4/1997 |
| JP | WO 01/54443 | 7/2001 |

(Continued)

OTHER PUBLICATIONS

Sohyun Kim et al., "Overall Ho Procedures for IEEE 802.16", Broadband Wireless Access Working Group, Sep. 4, 2003.

(Continued)

*Primary Examiner*—Nhan T Le
(74) *Attorney, Agent, or Firm*—The Farrell Law Firm, LLP

(57) ABSTRACT

A method for performing a handover by a subscriber station (SS) in a broadband wireless communication system including a serving base station (BS) communicating with the SS, and at least one neighbor BS neighboring the serving BS. The SS receives downlink signals from the serving BS and the neighbor BS; measures an arrival time difference between the downlink signal received from the serving BS and the downlink signal received from the neighbor BS; and transmits the measured arrival time difference to the serving BS.

19 Claims, 11 Drawing Sheets

FOREIGN PATENT DOCUMENTS

| | | |
|---|---|---|
| JP | 2002-505542 | 2/2002 |
| JP | 2002-510180 | 4/2002 |
| JP | 2002-538699 | 11/2002 |
| JP | 2003-520538 | 7/2003 |
| KR | 1020030064219 | 7/2003 |
| RU | 2 120 697 | 2/1994 |
| WO | WO 94/27383 | 11/1994 |
| WO | WO 95/02307 | 1/1995 |
| WO | WO 97/44970 | 11/1997 |
| WO | WO 99/37106 | 7/1999 |
| WO | WO 99/44306 | 9/1999 |
| WO | WO 00/51374 | 8/2000 |
| WO | WO 00/51393 | 8/2000 |
| WO | WO 02/15624 | 2/2002 |

OTHER PUBLICATIONS

Kitroser, 802.16e Handoff Description, Sep. 11, 2003.

* cited by examiner

METHOD AND APPARATUS FOR PERFORMING FAST HANDOVER THROUGH FAST RANGING IN A BROADBAND WIRELESS COMMUNICATION SYSTEM

PRIORITY

This application claims priority under 35 U.S.C. § 119 to an application entitled "Method and Apparatus for Performing Fast Handover through Fast Ranging in a Broadband Wireless Communication System" filed in the Korean Intellectual Property Office on Feb. 13, 2004 and assigned Serial No. 2004-9517, the contents of which are incorporated herein by reference.

BACKGROUND OF THE INVENTION

1. Field of the Invention

The present invention relates generally to a broadband wireless communication system, and in particular, to a method and apparatus for performing fast handover using fast ranging.

2. Description of the Related Art

A broadband wireless access communication system which is now under discussion in an Institute of Electrical and Electronics Engineers (IEEE) 802.16 standardization group performs point-to-multipoint communication between a base station (BS) and a subscriber station (SS). A physical (PHY) layer standard defines Time Division Duplexing (TDD) and Frequency Division Duplexing (FDD) as a duplexing scheme, and Time Division Multiplexing using Single Carrier (TDM-SC), Orthogonal Frequency Division Multiplexing (OFDM) and Orthogonal Frequency Division Multiple Access (OFDMA) as a multiplexing scheme, and defines a Medium Access Control (MAC) layer standard capable of operating in common in the foregoing PHY standards.

With reference to FIG. 1, a description will now be made of a conventional communication system configuration taken into consideration in IEEE 802.16.

FIG. 1 is a diagram schematically illustrating a configuration of a broadband wireless access communication system introducing the cellular concept, and in particular, a configuration of an IEEE 802.16e communication system.

Referring to FIG. 1, the IEEE 802.16e communication system is based on a cellular configuration, and is comprised of a BS#1 110 and a BS#2 130, each of which manages its own cell, a plurality of SSs 120a, 120b, 120c and 120d managed by the BS#1 110, and a plurality of SSs 140a, 140b and 140c managed by the BS#2 130. The SSs are classified into fixed SSs (FSS) and mobile SSs (MSS) according to their mobility.

A radio link 150 between the BSs 110 and 130 and the SSs 120a, 120b, 120c, 120d, 140a, 140b and 140c, through which signals are transmitted/received, is realized using the foregoing PHY schemes. The BSs 110 and 130 are connected to each other using a wire, for information exchange therebetween.

If the MSS #4 120d is moving to an overlapping area between the cells managed by the BS#1 110 and the BS#2 130 and continuously moves from the BS#1 110 currently serving the MSS#4 120d (called a serving BS) toward a BS#2 targeted by the MSS#4 120d (called a target BS), then handoff or handover will occur. That is, a serving BS of the MSS#4 120d is changed from the BS#1 110 to the BS#2 130.

FIG. 2 is a diagram illustrating a frame structure of a TDD OFDMA system, an example of a broadband wireless access communication system.

Referring to FIG. 2, a horizontal axis represents an OFDM symbol number, and a vertical axis represents a subchannel number. As illustrated in FIG. 2, each OFDMA frame includes a downlink (DL) subframe comprised of a plurality of, for example, 6 OFDM symbols, and an uplink (UL) subframe comprised of a plurality of, for example, 5 OFDM symbols. Each of the OFDM symbols is comprised of a plurality of, for example, M subchannels.

Each of the TDD OFDMA frames has DL-MAP 210 and UL-MAP 220 representing resource allocation information of downlink/uplink subframes. The DL-MAP message indicates how the resources constituting a downlink subframe are allocated to SSs, and the UL-MAP message indicates how the resources constituting an uplink subframe are allocated to the SSs.

The TDD OFDMA frame may include a Downlink Channel Descriptor (DCD) message 230a, an Uplink Channel Descriptor (UCD) message 230b, and a Neighbor Advertisement (NBR-ADV) message 230c, and those messages are periodically included in the TDD OFDMA frame and can be different from each other in terms of a reception period. The DCD message 230a includes downlink channel-related parameters, the UCD message 230b includes uplink channel-related parameters, and the NBR-ADV message 230c includes information on neighbor BSs.

FIG. 3 is a diagram illustrating an initial ranging procedure for compensating for a round trip delay (RTD) due to a position difference between a BS and an SS in a broadband wireless access communication system. Referring to FIG. 3, a BS 310 allocates an initial ranging interval 311 corresponding to a multiple of an initial ranging transmission opportunity capable of accepting an RTD of an SS#n 330 located in the farthest position from its cell coverage. In FIG. 3, the BS 310 includes one initial ranging transmission opportunity. After allocating the initial ranging interval, the BS 310 broadcasts its information to all of the SSs through a UL-MAP.

SSs that should perform initial ranging, e.g., an SS#1 320 and an SS#n 330, transmit Ranging Request (RNG-REQ) messages 321 and 331, respectively, at a start time of the initial ranging interval 311, designated by the UL-MAP. In an OFDMA scheme, the RNG-REQ message includes a CDMA ranging code.

The RNG-REQ messages 321 and 331 are transmitted on a competition basis, and the competition-based transmission may cause message collision for SSs located the same distance from the BS 310. To address this problem, the IEEE 802.16e communication system standard allows for the SSs to randomly determine transmission opportunities before transmitting the RNG-REQ messages. The OFDMA scheme allows for the SSs to randomly select before transmission not only the transmission opportunities but also the ranging codes from a specific set, thereby reducing message collision. However, the OFDMA scheme still suffers from the message collision.

The SS#1 320 and the SS#n 330 do not suffer RNG-REQ collision due to their different distances from the BS 310. Therefore, the BS 310 can successfully receive the transmitted RNG-REQ messages. The BS 310 can measure an RTD value 312a of the SS#1 320 by calculating a time difference between a reception time of the RNG-REQ message 321 transmitted from the SS#1 320 and the start time of the initial ranging interval 311, and can measure an RTD value 312b of the SS#n 330 by calculating a time difference between a reception time of the RNG-REQ message 331 transmitted from the SS#n 330 and the start time of the initial ranging interval 311.

The BS 310 permits the SSs 320 and 330 to adjust their uplink transmission times by supplying the measured RTD values to the SS#1 320 and the SS#n 330 through the Ranging Response (RNG-RSP) messages 322 and 332. The foregoing processes are repeated until the uplink transmission times of the SSs 320 and 330 arrive at a range specified by the BS 310. As the BS 310 allocates uplink resources to the SS#1 320 and the SS#n 330, the following RNG-REQ transmission can be achieved on a non-competition basis.

FIG. 4 is a flowchart illustrating an initial network entry and handover procedure of an MSS according to the IEEE 802.16e communication system standard. Referring to FIG. 4, upon power-on, the MSS first performs a cell selection process (Step 401). The cell selection process is a quality measurement process for uplink/downlink channels, and includes the process of receiving DL/UL-MAP messages and DCD/UCD messages for the downlink, and the initial ranging process for the uplink. In the cell selection process, the MSS records the collected information on a plurality of cells for future use, selects a cell providing the best uplink/downlink quality from among the cells, and performs a network entry process described below according to the cell selection result.

After completion of the cell selection, the MSS performs a process of synchronizing to a downlink provided by a BS of the selected cell and acquiring reception parameters (Step 403). The parameter acquisition process is comprised of a process of continuously receiving DL-MAP messages and receiving their associated DCD messages. After the downlink synchronization, the MSS should receive an UCD message from the BS in order to acquire possible transmission parameters for an uplink channel (Step 405).

After acquiring the uplink parameters, the MSS adjusts its uplink transmission parameters such as time offset, frequency offset and power offset through an initial ranging procedure (Step 407). During the initial ranging procedure, the MSS is allocated, from a BS, a connection identifier (CID) to be used later for the transmission/reception of a control message.

Upon completion of the initial ranging, the MSS supplies its traffic transmission/reception capabilities to the BS, and the BS supplies the following MSS-BS traffic transmission/reception capabilities to the MSS through a message, based on information on the MSS and its transmission/reception capabilities, thereby performing a basic capacity negotiation procedure (Step 409).

After the basic capacity negotiation procedure, the MSS should perform authorization and key exchange with the BS according to a procedure specified in the IEEE 802.16 standardization (Step 411). After completion of the authorization and key exchange, the MSS is allocated from the BS an additional CID for the control purpose and registers with the BS (Step 413). After completion of the registration with the BS, the MSS is allocated an Internet Protocol (IP) address for traffic transmission/reception during an IP connection setup process (Step 415), and performs a process of setting a system time and acquiring system operation parameters (Step 417). Subsequently, the MSS is allocated an additional CID to be used for traffic transmission/reception for each service flow (Step 419), and then ends a network entry procedure if it arrives at a normal mode for traffic transmission/reception (Step 423).

In the normal mode, an MSS that can transmit/receive traffic needs to perform periodic ranging at intervals of the time negotiated with the BS in order to acquire uplink synchronization and maintain/correct transmission parameters. In addition, the MSS should acquire a network topology with the assistance of the BS (Step 421). This enables a faster network re-entry process during handover. The network topology acquisition (Step 421) is achieved through periodic broadcasting by the BS of information of neighbor BSs. Here, the broadcasting by the BS of information of neighbor BSs is achieved through the transmission of an NBR-ADV message.

If a level of a downlink signal transmitted from the BS, i.e. a serving BS, drops below a specified threshold, the MSS searches for a BS to serve as a new serving BS, i.e. a target BS, using the information of the neighbor BSs acquired through the NBR-ADV message. At this point, the MSS can only measure the levels of the downlink signals from the candidate target BSs, or transmit the RNG-REQ messages to the candidate target BSs along with the level measurement on the downlink signals. In the following description, the former case where the MSS only measures the levels of the downlink signals from the target BSs will be referred to as "passive scanning," while the latter case where the MSS performs both the downlink signal level measurement and the RNG-REQ message transmission will be referred to as "active scanning."

The candidate target BS receiving the RNG-REQ message transmitted through the active scanning provides the MSS with an uplink parameter adjustment value and an estimated service level through the RNG-RSP transmission. When a downlink signal level of the serving BS is less than a signal level of a candidate target BS collected through the scanning process, the MSS transmits a Handover Request (HO-REQ) message to the serving BS to thereby start a handover process (Step 425).

The HO-REQ message can include information related to a plurality of candidate target BSs. The serving BS receiving the HO-REQ message selects the best target BS through the information exchange with the candidate target BSs, and notifies the MSS of the selected best target BS through a Handover Response (HO-RSP) message. The MSS receiving the HO-RSP message sends a Handover Indication (HO-IND) message to the serving BS, and the serving BS withdraws all of the system resources allocated to the MSS upon receipt of the HO-IND message (Step 427).

The MSS begins a network re-entry process to the target BS starting with the process of synchronizing to a downlink from the target BS and acquiring related parameters (Step 431). Subsequently, the MSS performs an uplink parameters adjustment process (Step 437) through a uplink parameter acquisition procedure (Step 433) and a ranging procedure (Step 435).

After successfully adjusting the uplink parameters, the MSS performs an authorization process with a new serving BS (Step 439), and sets up a connection with a MAC layer by performing a registration process with the new serving BS (Step 441). By doing so, the MSS can normally perform data transmission/reception with the new serving BS, and can be allocated a new IP address in the following process (Step 443).

As described above, in the conventional technology, a BS can assign a CID to a corresponding SS while transmitting an RNG-RSP message in response to an RNG-REQ message, and can allocate uplink resources for the following non-competition-based transmission of RNG-REQ message. At this point, such resources are not necessary for an SS aiming at cell selection and topology acquisition.

SUMMARY OF THE INVENTION

The conventional technology is disadvantageous in that an SS undergoing handover performs the competition-based ranging transmission in a network topology acquisition process or a network re-entry process. This may cause not only a waste of network resources but also an unexpected considerable delay, and becomes a direct cause of quality deterioration of service traffic for an SS attempting a handover.

Further, in the conventional method, when a target BS allocates an information element for fast ranging, the target BS is required to allocate resources capable of accepting a maximum RTD as described above, causing an inefficient use of the resources, and an unexpected considerable delay is caused by a competition-based ranging request occurring in the scanning process.

It is, therefore, an object of the present invention to provide a method and apparatus for more effectively operating a ranging process in a broadband wireless access communication system using a cellular scheme.

It is another object of the present invention to provide a method and apparatus for more rapidly performing a handover by receiving an allocated temporary connection identifier (CID) from a target base station during the scanning for a handover in a broadband wireless access communication system.

It is further another object of the present invention to provide a method and apparatus for more rapidly performing handover by effectively estimating a round trip delay (RTD) for a target base station, required for a handover, by a subscriber station in a broadband wireless access communication system.

It is yet another object of the present invention to provide a method and apparatus for more rapidly performing a handover by performing fast ranging with a target base station based on a short-length CID during handover in a broadband wireless access communication system.

In accordance with a first aspect of the present invention, there is provided a method for performing a handover by a subscriber station (SS) in a broadband wireless communication system including a serving base station (BS) communicating with the SS, and at least one neighbor BS neighboring the serving BS. The method comprises the steps of receiving downlink signals from the serving BS and the neighbor BS, measuring an arrival time difference between the downlink signal received from the serving BS and the downlink signal received from the neighbor BS and transmitting the measured arrival time difference to the serving BS.

In accordance with a second aspect of the present invention, there is provided a method for performing a handover by a subscriber station (SS) from a serving base station (BS) to a target BS selected from a plurality of neighbor BSs in a broadband wireless communication system including the serving BS communicating with the SS, and the plurality of neighbor BSs neighboring the serving BS. The method comprises the steps of transmitting a ranging request message to the target BS; receiving from the target BS in response to the ranging request message a ranging response message including a temporary connection identifier (CID) allocated to the SS; and receiving an allocated fast ranging information element from the target BS through the temporary CID upon determining handover to the target BS.

In accordance with a third aspect of the present invention, there is provided a method for performing a handover by a subscriber station (SS) from a serving base station (BS) to a target BS selected from a plurality of neighbor BSs in a broadband wireless communication system including the serving BS communicating with the SS, and the plurality of neighbor BSs neighboring the serving BS. The method comprises the steps of measuring a arrival time difference of a downlink signal received from the target BS relative to a downlink signal received from the serving BS; estimating a round trip delay between the SS and the neighbor BS using the measured arrival time difference; and transmitting to the serving BS a handover request message including the estimated round trip delay.

In accordance with a fourth aspect of the present invention, there is provided a method for performing a handover by a subscriber station (SS) from a serving base station (BS) to a target BS selected from a plurality of neighbor BSs in a broadband wireless communication system including the serving BS communicating with the SS, and the plurality of neighbor BSs neighboring the serving BS. The method comprises the steps of measuring a carrier-to-interference and noise ratio (CINR) of a signal transmitted from the serving BS, and comparing the measured result value with a predetermined threshold; if the measured result value is less than the threshold, scanning for a neighbor BS, detecting a signal transmitted from the neighbor BS, and measuring a CINR of the detected signal and a signal arrival time difference relative to the signal transmitted from the serving BS; after the scanning for the neighbor BSs, transmitting a handover request message including the measured signal arrival time difference; upon receiving a handover response message from the serving BS in response to the handover request message, transmitting a handover indication message to the serving BS; and performing a network re-entry process with a round trip delay(RTD) reflected by the signal arrival time difference for handover to the target BS.

In accordance with a fifth aspect of the present invention, there is provided a method for supporting handover by a serving base station (BS) in a broadband wireless communication system including the serving BS in data communication with a subscriber station (SS), and at least one neighbor BS neighboring the serving BS. The method comprises the steps of receiving from the SS a handover request message including an arrival time difference measured by the SS between the downlink signals from the serving BS and from the neighbor BS of a selected neighbor BS; estimating a round trip delay (RTD) information through the arrival time difference; and transmitting the estimated RTD information to the selected neighbor BS.

In accordance with a sixth aspect of the present invention, there is provided a method for supporting handover by a serving base station (BS) in a broadband wireless communication system including the serving BS in data communication with a subscriber station (SS), and at least one neighbor BS neighboring the serving BS. The method comprises the steps of receiving from the SS a handover request message including a round trip delay (RTD) information estimated by the SS between the SS and the neighbor BS of a selected neighbor BS; and transmitting the RTD information to the selected neighbor BS.

In accordance with a seventh aspect of the present invention, there is provided a method for supporting a handover by a serving base station (BS) in a broadband wireless communication system including the serving BS communicating with a subscriber station (SS), and a plurality of neighbor BSs neighboring the serving BS. The method comprises the steps of upon receiving a handover request message from a particular SS, generating a handover table using information related to the handover request message; transmitting a handover notification message including information related to the SS that transmitted the handover request message, to the neighbor BSs; upon receiving a handover notification response message corresponding to the handover notification message from the neighbor BSs, updating the handover table using information included in the handover notification response message; setting a target BS that can provide the SS with an appropriate service level by analyzing a temporary connection identifier (CID) included in the handover notification response message, and transmitting to the target BS a handover confirm message indicating that the SS will be handed over to the target BS; and after transmitting the handover confirm message, transmitting to the SS a handover response message including information on the target BS and the temporary CID.

In accordance with an eighth aspect of the present invention, there is provided a method for supporting a handover by a target base station (BS) in a broadband wireless communication system including a serving BS communicating with a particular subscriber station (SS), and a plurality of neighbor BSs neighboring the serving BS. The method comprises the steps of receiving from the serving BS a handover notification message including a estimated round trip delay between the SS and the target BS; determining to approve handover requested by a handover requesting SS included in the handover notification message, determining a bandwidth and a service level, which can be provided to the SS; transmitting to the serving BS the handover notification response message including the determined information in a handover notification response message; and upon receiving a handover confirm message from the serving BS in response to the handover notification response message, allocating a fast ranging information element reflected by the estimated round trip delay for a fast ranging to the SS.

In accordance with a ninth aspect of the present invention, there is provided a method for performing a handover by a subscriber station (SS) from a serving base station (BS) to a target BS selected from a plurality of neighbor BSs in a broadband wireless communication system including the serving BS communicating with the SS, and the plurality of neighbor BSs neighboring the serving BS. The method comprises the steps of estimating a round trip delay (RTD) value to the target BS based on an RTD value to the serving BS and a signal arrival time difference between a signal received from the serving BS and a signal received from the target BS; transmitting the estimated RTD-value to the target BS to the serving BS; and determining to perform a handover to the target BS, and receiving from the target BS a message including an allocated fast ranging information element and the estimated RTD value.

In accordance with a tenth aspect of the present invention, there is provided a subscriber station (SS) apparatus for performing a handover from a serving base station (BS) to a target BS selected from a plurality of neighbor BSs in a broadband wireless communication system including the serving BS communicating with the SS, and the plurality of neighbor BSs neighboring the serving BS. The apparatus comprises a receiver for calculating an arrival time difference between a signal received from the serving BS and a signal received from the target BS; a medium access control (MAC) processor for estimating a round trip delay (RTD) value to the target BS based on an RTD value to the serving BS and the arrival time difference calculated by the receiver; and a transmitter for transmitting the RTD value to the target BS, estimated by the MAC processor, to the serving BS or the target BS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail with reference to the annexed drawings. In the following description, a detailed description of known functions and configurations incorporated herein has been omitted for conciseness.

The present invention proposes an indirect initial ranging (IIR) method to reduce a time delay required in an initial ranging process with a target base station (BS) during a handover.

The IIR method according to the present invention reduces scanning overhead and minimizes a time delay by allowing a subscriber station (SS) to estimate a round trip delay (RTD) through a downlink frame preamble (DFP) received from a target BS during a scanning process.

In the present invention, a BS allocating a fast ranging information element (IE) uses a 16-bit temporary connection identifier (CID) instead of a 48-bit MAC address during a handover in order to distinguish a corresponding SS, thereby increasing resource efficiency.

In addition, the present invention enables fast ranging during handover by allowing an SS to be allocated a temporary CID from a target BS during scanning for a handover.

Preferred embodiments of the present invention will now be described in detail with reference to FIGS. 5 to 11.

Figure 1:
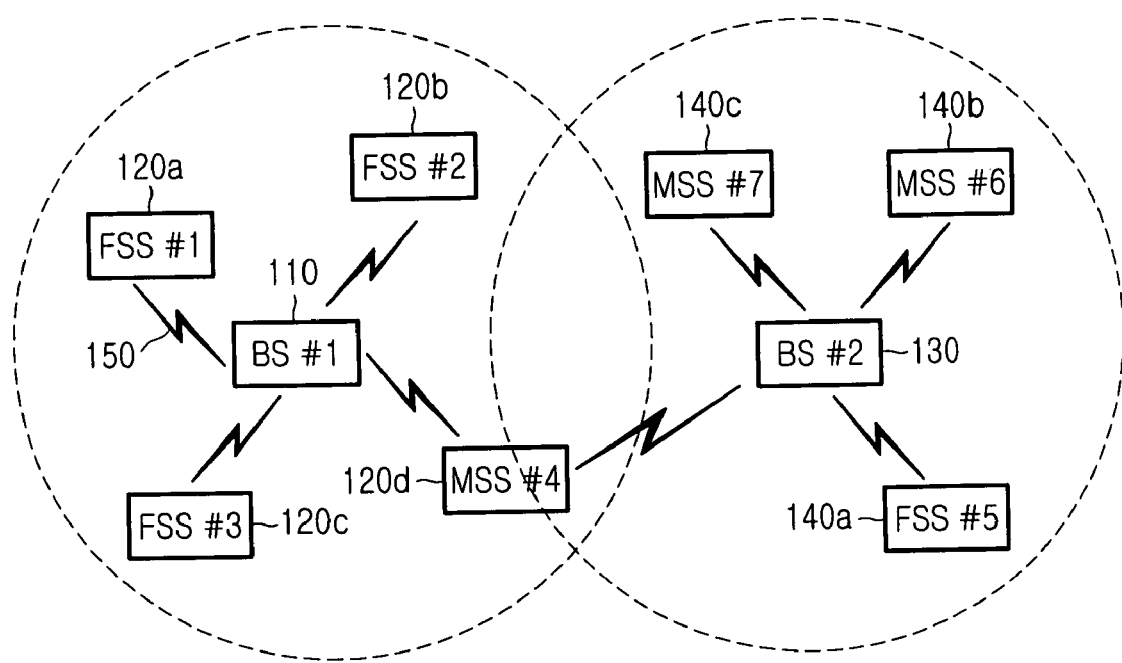
FIG. 1 is a diagram illustrating a configuration of a broadband wireless access communication system supporting handover.
Figure 2:
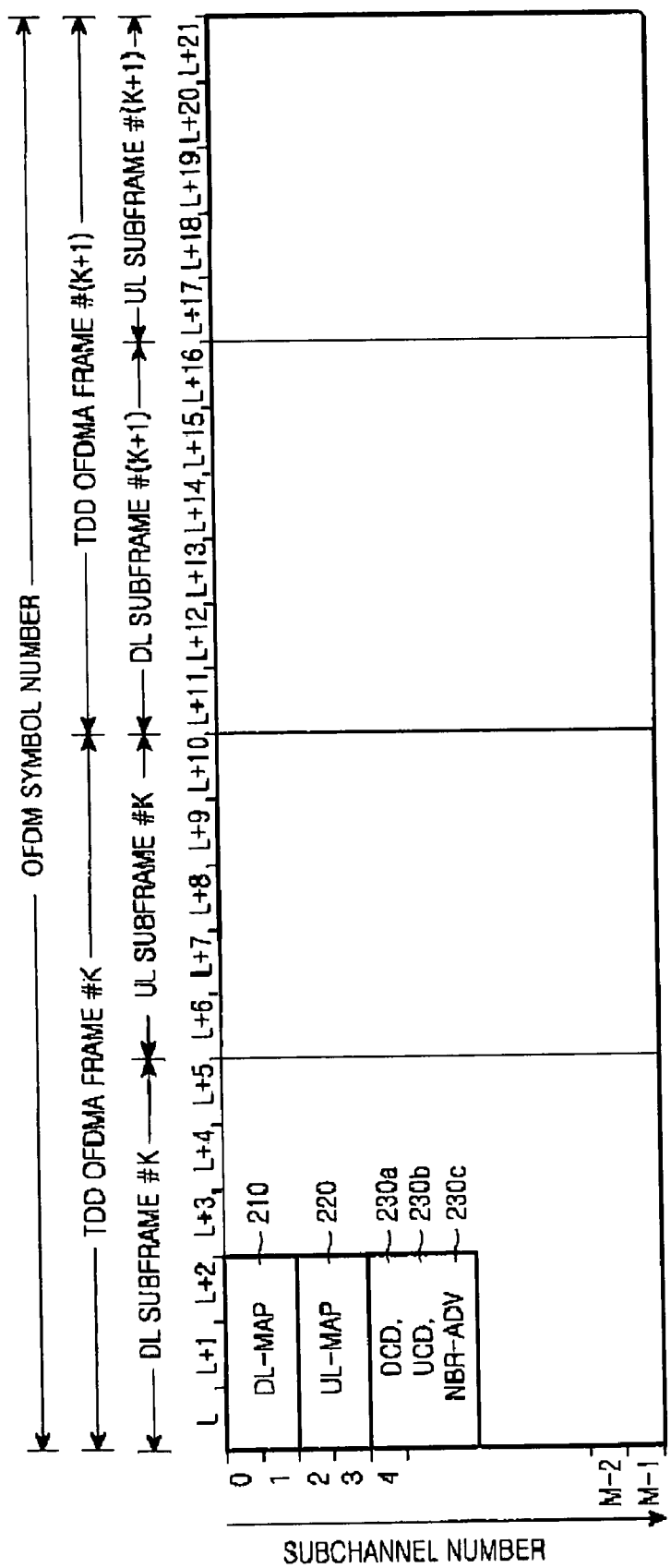
FIG. 2 is a diagram illustrating a time-frequency domain frame structure of a TDD OFDMA broadband wireless communication system.
Figure 3:
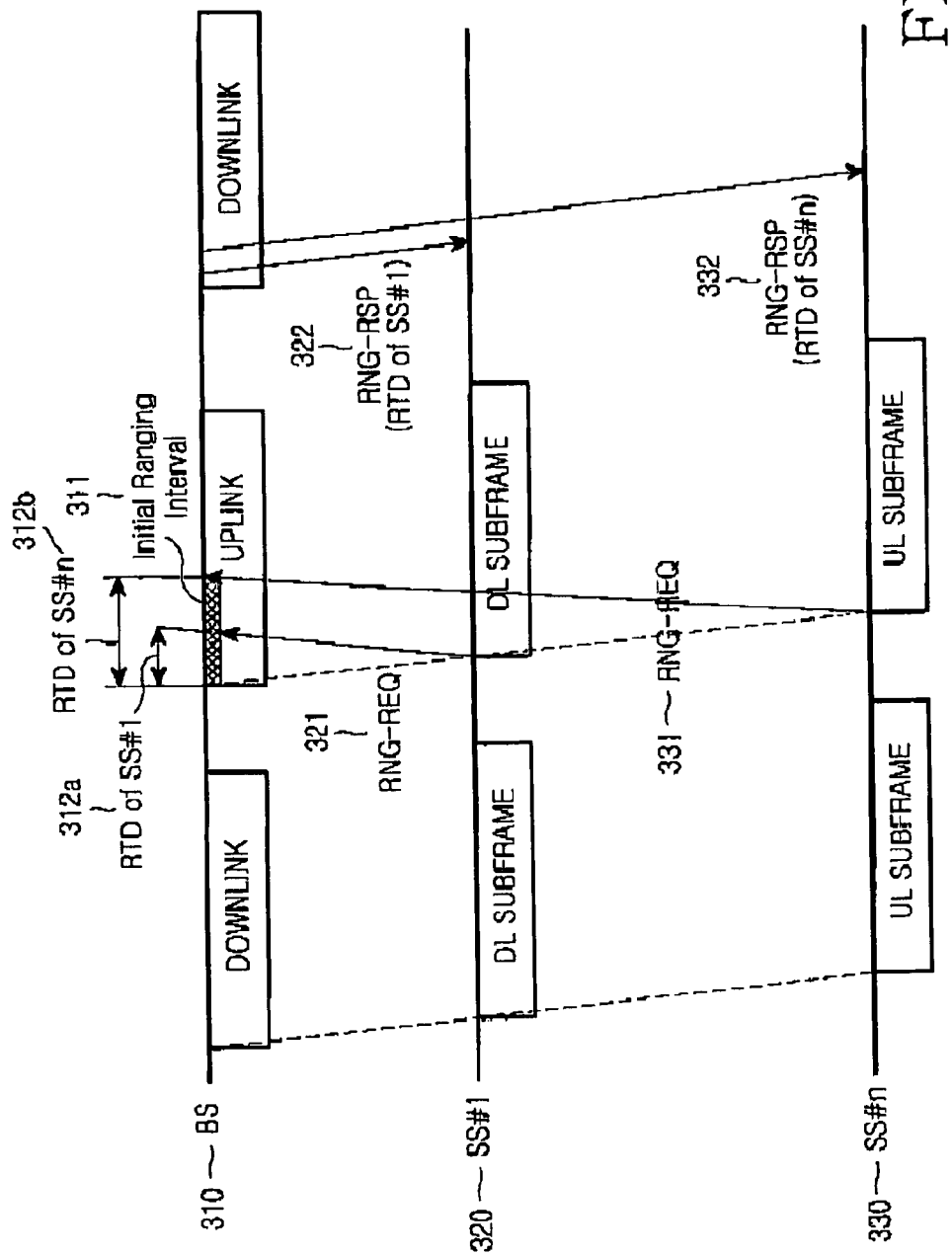
FIG. 3 is a diagram illustrating an initial ranging procedure for compensating for a round trip delay (RTD) due to a position difference between a BS and an SS in a broadband wireless access communication system.
Figure 4:
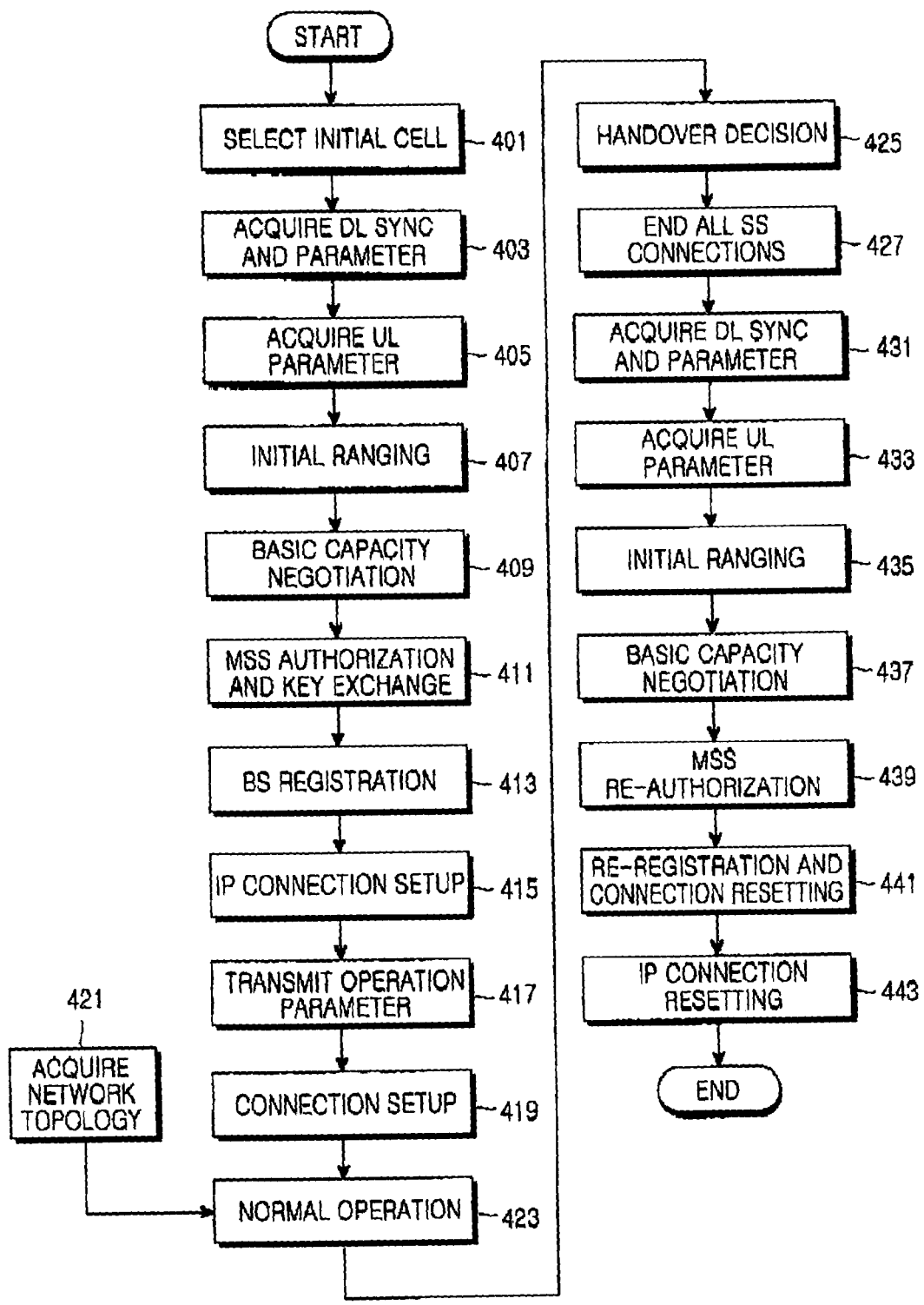
FIG. 4 is a flowchart illustrating an initial network entry and handover procedure of an MSS according to an IEEE 802.16e communication system standard.
Figure 5:
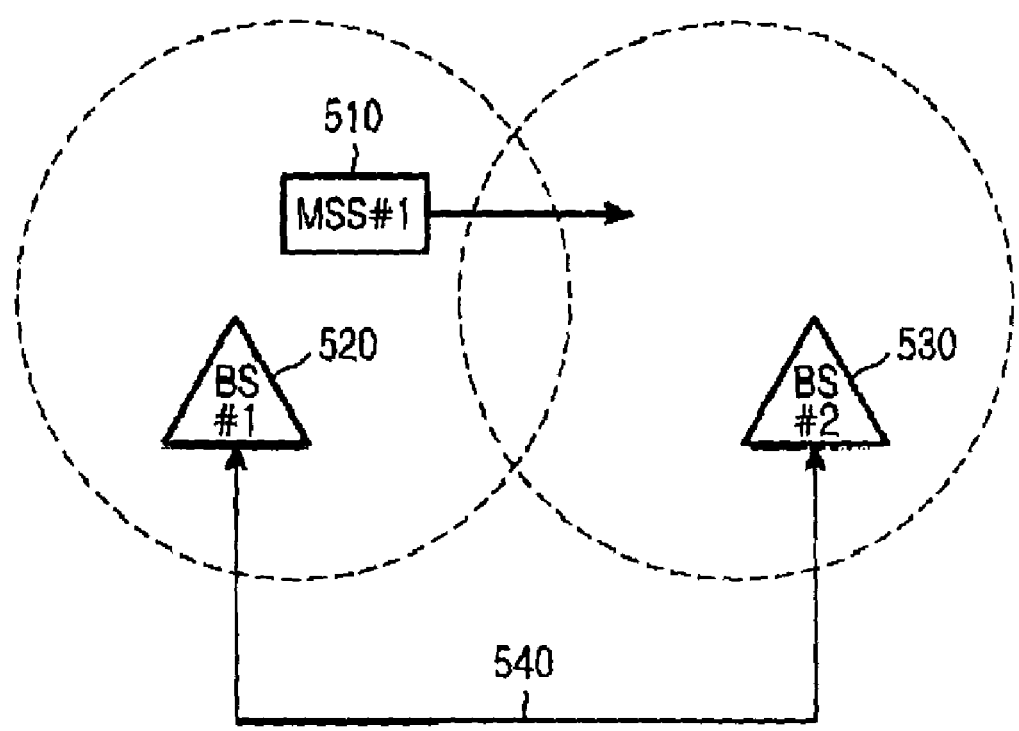
FIG. 5 is a diagram illustrating a handover situation occurring due to movement of an MSS.

With reference to FIG. 5, a brief description will now be made of a situation where handover occurs in a broadband wireless access communication system.

FIG. 5 is a diagram illustrating a handover situation occurring due to movement of an MSS. Referring to FIG. 5, as an MSS#1 510 being serviced by a BS#1 520 moves toward a BS#2 530, BS#1 520 attempts a handover of MSS#1 510 to the BS#2 530. In this case, the BS#1 520, MSS#1 510 and BS#2 530 perform a fast ranging process according to the present invention. Here, as described above, the BS#1 520 and the BS#2 530 can exchange information through a wired network 540 connected thereto.

In this structure, the conventional fast ranging method allows the MSS#1 510 to transmit a non-competition-based initial ranging request to the BS#2 530, thereby enabling faster ranging. However, the conventional fast ranging method causes inefficient resource allocation of the BS#2 530. That is, the BS#2 530 should allocate resources capable of accepting an RTD between the MSS#1 510 and the BS#2 530. In addition, the BS#2 530 should use a 48-bit MAC address in order to designate the SS#1 510 in a resource allocation notification process through a UL-MAP message. Therefore, the present invention proposes an efficient fast ranging method through FIGS. 6 and 7.

As described above, a scanning process in which an SS measures levels of signals received from neighbor BSs in order to perform a handover is divided into passive scanning in which the SS only measures levels of downlink signals from target BSs and active scanning in which the SS performs both downlink signal level measurement and RNG-REQ message transmission. A detailed description will now be separately made of a fast ranging method based on the passive scanning and a fast ranging method based on the active scanning.

First Embodiment (Active Scanning-Based Handover Procedure)

Figure 6:
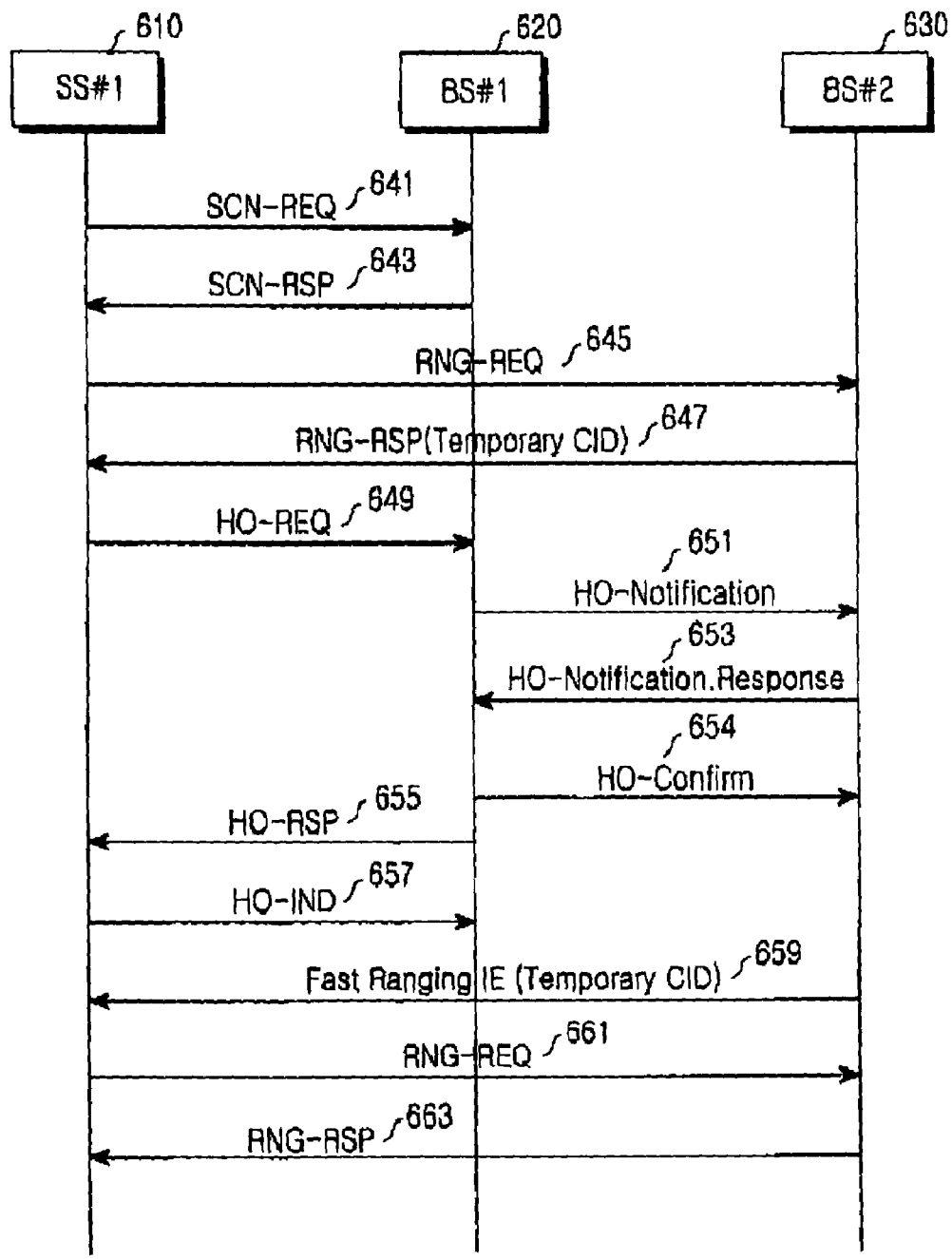
FIG. 6 is a signaling diagram illustrating an active scanning-based handover procedure through fast ranging according to a first embodiment of the present invention.

FIG. 6 is a signaling diagram illustrating an active scanning-based handover procedure through fast ranging according to a first embodiment of the present invention. Referring to FIG. 6, a handover method according to the first embodiment of the present invention allocates uplink resources through a 16-bit CID instead of a 48-bit MAC address of an SS used in the conventional fast ranging method.

Referring to FIG. 6, an SS#1 610 requiring a handover transmits a Scanning Request (SCN-REQ) message to a BS#1 620 (Step 641), and receives a Scanning Response (SCN-RSP) message from the BS#1 620 in response to the SCN-REQ message (Step 643). Thereafter, the SS#1 610 transmits an initial Ranging Request (RNG-REQ) message to a BS#2 630 according to an active scanning process (Step 645). The BS#2 630 transmits a Ranging Response (RNG-RSP) message to the SS#1 610 in response to the RNG-REQ message (Step 647). At this point, the BS#2 630 can allocate a temporary CID to the SS#1 610 according to an embodiment of the present invention. The temporary CID represents a CID that can be temporarily used by the SS#1 610 to perform initial ranging to a target base station for handover, i.e., the BS#2 630. Therefore, the BS#2 630 can be implemented so as to withdraw an allocated temporary CID if there is no traffic transmitted from the SS#1 610 using the allocated temporary CID until a specified time.

After completion of the scanning procedure, if the SS#1 610 transmits a Handover Request (HO-REQ) message for handover to the BS#2 630 to the BS#1 620 (Step 649), the BS#1 620 notifies the BS#2 630 of the handover request by the SS#1 610 using a Handover Notification (HO-Notification) message (Step 651). Then the BS#2 630 informs the BS#1 620 whether to accept the handover, using a Handover Notification Response (HO-Notification.Response) message (Step 653). Then the BS#1 620 receives the HO-Notification.Response message, and determines the BS#2 630 as a target BS to which the SS#1 610 will be handed over if it is determined that the BS#2 630 can accept the handover. Thereafter, the BS#1 620 transmits a Handover Confirm (HO-Confirm) message to the BS#2 630 (Step 654).

Thereafter, the BS#1 620 notifies the SS#1 610 whether the BS#2 630 accepts the handover in response to the HO-REQ message from the SS#1 610, using a Handover Response (HO-RSP) message (Step 655). Then the SS#1 610 transmits a Handover Indication (HO-IND) message to the BS#1 620 (Step 657), thereby making a final handover decision.

When the BS#2 630 accepts the handover request from the SS#1 610, it can give a non-competition-based initial ranging request message transmission opportunity to the SS#1 610 through Fast Ranging IE allocation (Step 659). The Fast Ranging IE allocation can use a temporary CID allocated in the scanning process, instead of a MAC address of the SS#1 610, according to an embodiment of the present invention. Given that the MAC address of the SS#1 610 is generally comprised of 48 bits and the CID is generally comprised of 16 bits, the use of the temporary CID can contribute to a reduction in resources.

Thereafter, the SS#1 610 transmits/receives an RNG-REQ message and an RNG-RSP message to/from the BS#2 630 (Steps 661 and 663), thereby performing initial ranging.

The foregoing method according to the first embodiment of the present invention is an active scanning-based method, and cannot guarantee fast ranging because competition-based initial ranging request message transmission occurs in the foregoing process. A second embodiment of the present invention proposes an indirect initial ranging (IIR) method as another method capable of minimizing a handover delay.

The IIR method allows an SS desiring to perform handover to omit the active scanning process, and allows a target BS to allocate a Fast Ranging IE with high resource efficiency, thereby enabling fast handover with high resource efficiency. The IIR method according to the second embodiment of the present invention will now be described in detail with reference to FIG. 7.

Second Embodiment (IIR-Based Handover Procedure)

Figure 7:
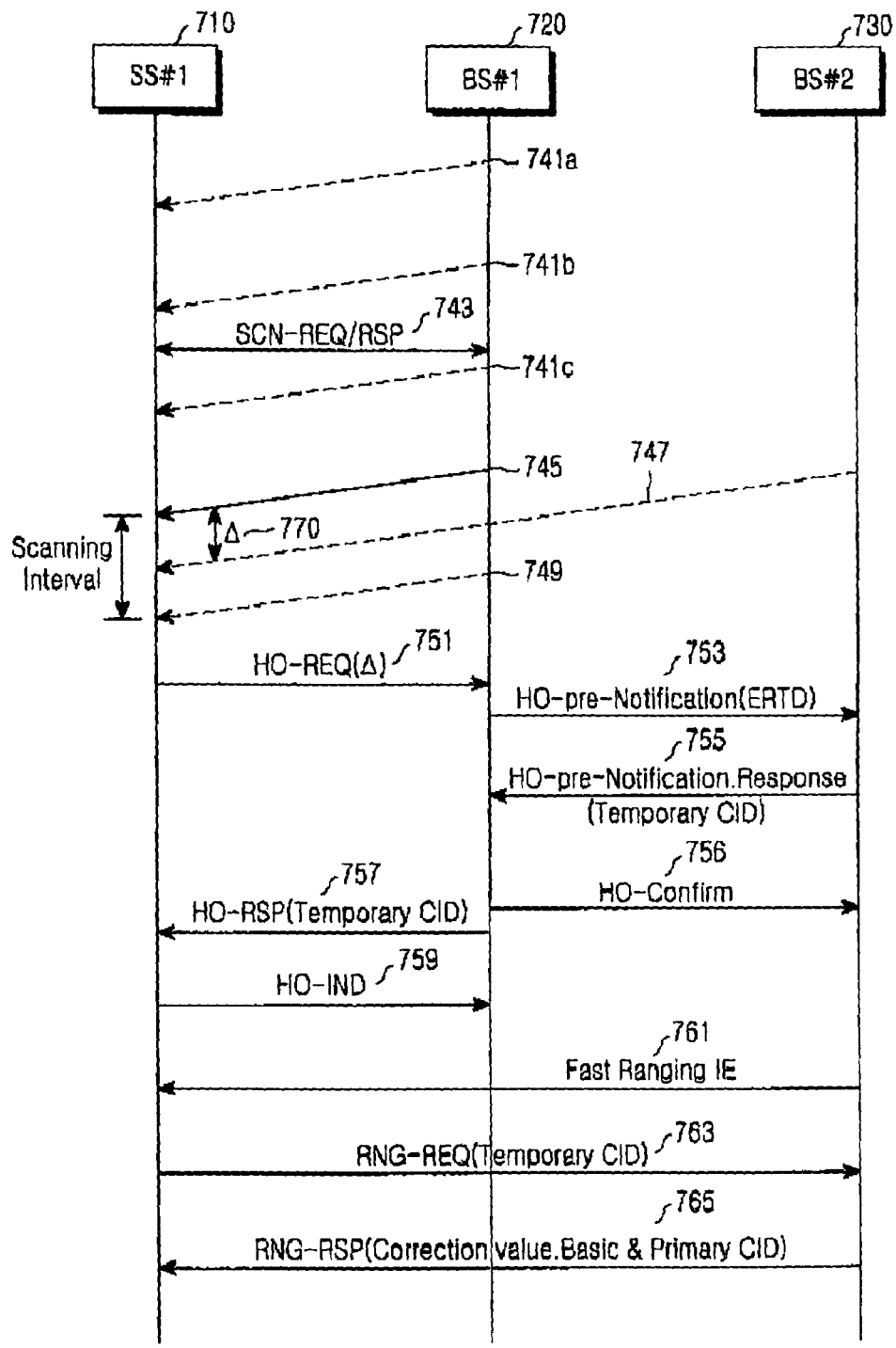
FIG. 7 is a signaling diagram illustrating a passive scanning-based handover procedure through fast ranging according to a second embodiment of the present invention.

FIG. 7 is a signaling diagram illustrating a passive scanning-based handover procedure through fast ranging according to the second embodiment of the present invention. FIG. 7 illustrates an IIR procedure for fast handover proposed in the present invention, wherein during a network topology acquisition process performed during handover, an SS estimates an RTD value of a target BS simply by using an arrival time difference between reference signals transmitted from a serving BS and the target BS, without transmitting/receiving ranging messages to/from the target BS.

Referring to FIG. 7, an SS#1 710 desiring to perform handover receives periodic downlink frame preambles (DFP) 741a, 741b, 741c, 745 and 749 each having a TDD/FDD frame duration period, from a BS#1 720. The SS#1 710 can generate and correct its own clock based on the DFP signals 741a, 741b, 741c, 745 and 749 periodically transmitted from the BS#1 720.

If a carrier-to-interference and noise ratio (CINR) value of the DFP 741b transmitted from the BS#1 720 drops below a specified threshold, the SS#1 710 transmits an SCN-REQ message to the BS#1 720 to search for a new BS and then receives an SCN-RSP message from the BS#1 720 to perform scanning (Step 743).

At this point, the SS#1 710 receives a DFP 747 transmitted from the BS#2 730, and can measure a difference value A (770), Difference Time of downlink frame Preamble Arrival (DTPA), between the DFP 745 from the BS#1 720 and the DFP 747 from the BS#2 730 through its own clock generated/corrected based on the DFPs 741a, 741b, 741c, 745 and 749 periodically transmitted from the BS#1 720.

The SS#1 710 can estimate an RTD value RTD_BS2 to the BS#2 730 through the measured DTPA value 770. The RTD_BS2 can be estimated using an RTD value RTD_BS1 measured through a raging process with the BS#1 720 and the DTPA value 770 in accordance with Equation 1.

$$RTD\_BS2 = RTD\_BS1 + 2DTPA \quad (1)$$

With reference to Equation 1, the RTD value RTD_BS2 between the SS#1 710 and the BS#2 730 can be estimated as a value determined by reflecting a round trip time difference (2×DTPA) between the BS#1 720 and the BS#2 730 in the RTD value RTD_BS1 between the SS#1 710 and the BS#1 720. Therefore, the estimated RTD value RTD_BS2 of the BS#2 730 can be used as a time correction value that can be reflected when the SS#1 710 transmits it to the BS#2 730. Here, the estimated RTD value RTD_BS2 of the BS#2 730 can be acquired through an initial ranging request/response with the SS#1 710 and the BS#2 730.

In order for the BS#2 730 to allocate a Fast Ranging IE to the SS#1 710 with high resource efficiency, the SS#1 710 is required to know the RTD_BS2 value which is a correction value to be applied for uplink transmission. To this end, the second embodiment of the present invention proposes to allow the SS#1 710 to include the measured DTPA value 770 or RTD_BS2 value in an HO-REQ message transmission process (Step 751).

The BS#1 720 receiving the HO-REQ message includes the received estimated DTPA value or estimated RTD_BS2 (ERTD) value in an HO-pre-Notification (i.e., HO-Notification) message and transmits the HO-pre-Notification message to the BS#2 730 (Step 753). The BS#2 730 can perform Fast Ranging IE allocation with high resource efficiency by reflecting an RTD_BS2 correction value of the SS#1 710 through the HO-pre-Notification message received from the BS#1 720.

Like the first embodiment of the present invention, the second embodiment of the present invention can also use a 16-bit CID instead of a 48-bit MAC address of the SS#1 710. That is, the BS#2 730 allocates a temporary CID to the SS#1 710 recognized through the HO-pre-Notification message, and notifies the BS#1 720 of the allocation of the temporary CID through an HO-pre-Notification.Response (i.e., HO-Notification.Response) message (Step 755). Then the BS#1 720 receiving the HO-pre-Notification.Response message determines that the BS#2 730 can accept the handover, and selects the BS#2 730 as a target BS to which the SS#1 710 will be handed over. Then the BS#1 720 transmits an HO-Confirm message to the BS#2 730 (Step 756). Thereafter, the BS#1 720 notifies the SS#1 710 of the received temporary CID through an HO-RSP message (Step 757).

The SS#1 710 receiving the HO-RSP message transmits an HO-IND message to the BS#1 720 (Step 759), and receives a Fast Ranging IE from the BS#2 720 (Step 761). Thereafter, the SS#1 710 and the BS#2 730 exchange an RNG-REQ message and an RNG-RSP message with each other in the method described in connection with FIG. 6 (Steps 763 and 765), perform initial ranging.

Although the active scanning-based handover method according to the first embodiment of the present invention allows for the subscriber station (i.e., SS#1) to be allocated a temporary CID when receiving an RNG-RSP message from the target BS (i.e., BS#2), it is preferable that the passive scanning-based handover method according to the second embodiment of the present invention allows the SS#1 to be allocated the temporary CID when receiving an HO-RSP message from the BS#2.

Table 1 though Table 4 illustrate the message formats in which fields should be partially modified or added for implementation of the present invention.

TABLE 1

| Syntax | Size |
|---|---|
| HO-REQ_Message_Format ( ) { | |
|     Message Type | 8 bits |
|     N_Recommended | 8 bits |
|     Estimated HO Time | 8 bits |
|     For (j=0: j<N_Recommended: j++) { | |
|         Neighbor BS ID | 48 bits |
|         BS CINR | 8 bits |
|         DTPA or ERTD | 8 bits |
|         Service level prediction | 8 bits |
|     } | |
| } | |

TABLE 2

| Syntax | Size |
|---|---|
| HO-RSP_Message_Format ( ) { | |
|     Message Type | 8 bits |
|     Estimated HO time | 8 bits |
|     N_Recommended | 8 bits |
|     For (j=0: j<N_Recommended: j++) { | |
|         Neighbor BS ID | 48 bits |
|         Temporary CID | 16 bits |
|         Service level prediction | 8 bits |
|     } | |
| } | |

TABLE 3

| Syntax | Size |
|---|---|
| HO-pre-Notifcation_Message_Format ( ) { | |
|     Global Header | 152 bits |
|     For (j=0: j<Num_Records: j++) { | |
|         SS unique identifer | 48 bits |
|         Estimated HO time | 8 bits |
|         Required BW | 8 bits |
|         Required QoS | 8 bits |
|         ERTD | 8 bits |
|     } | |
|     Security field | 48 bits |
|     CRC field | 8 bits |
| } | |

TABLE 4

| Syntax | Size |
|---|---|
| HO-pre-Notifcation-response_Message_Format ( ) { | |
|     Global Header | 152 bits |
|     For (j=0: j<Num_Records: j++) { | |
|         SS unique identifer | 48 bits |
|         BW Estimated | 8 bits |
|         QoS Estimated | 8 bits |
|         Temporary CID | 16 bits |
|     } | |
|     Security field | 48 bits |
|     CRC field | 8 bits |
| } | |

Referring to Table 1 to Table 4, an HO-REQ message format of Table 1 should have a DTPA or Estimated RTD (ERTD) field added to the conventional message format, an HO-RSP message format of Table 2 should have a Temporary CID field added to the conventional message format, an HO-pre-Notification message format of Table 3 should have an ERTD field added to the conventional message format, and an HO-pre-Notification.Response message format of Table 4 should have a Temporary CID field replacing an Ack/Nack field in the conventional message format.

Figure 8:
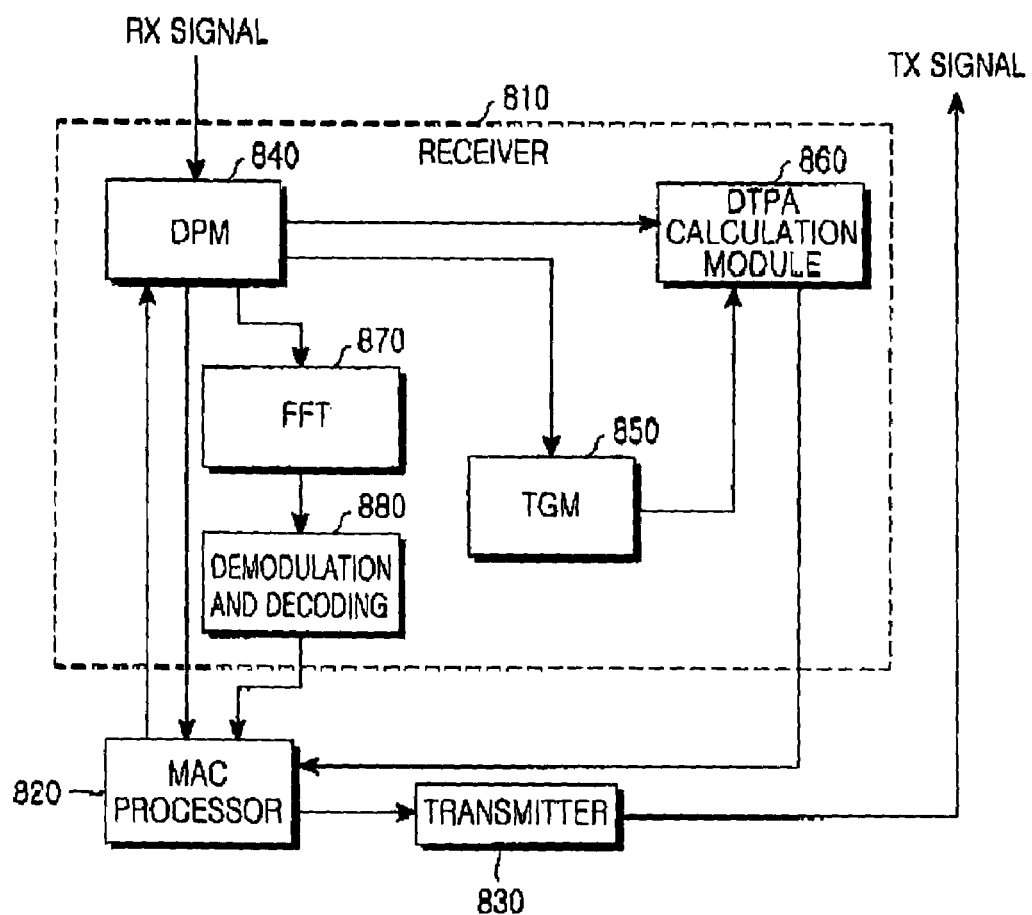
FIG. 8 is a block diagram illustrating a structure of a transceiver in an SS apparatus according to an embodiment of the present invention.

With reference to FIG. 8, a description will now be made of a transceiver of an SS for performing the handover method according to the embodiments of the present invention.

FIG. 8 is a block diagram illustrating an apparatus for performing an operation of the SS described in connection with FIG. 7. Referring to FIG. 8, the SS apparatus is comprised of a receiver 810, a MAC processor 820, and a transmitter 830. The receiver 810 is comprised of a DFP processing module (DPM) 840, a timing generation module (TGM) 850, a DTPA calculation module 860, a Fast Fourier Transform (FFT) unit 870 for reception data processing, and a demodulator and FEC decoder 880.

The DPM 840 is a module for processing a DFP, or a reference signal, received from a current serving BS, and measures a CINR of the serving BS and if the measured CINR drops below a threshold, notifies the MAC processor 820 of the drop of the measured CINR. Further, the DPM 840 notifies the TGM 850 of a periodic DFP arrival time, and receives a DFP of a neighbor BS in response to a scanning request by the MAC processor 820. In addition, the DPM 840 notifies the DTPA calculation module 860 of an arrival time of a neighbor BS's DFP received through scanning, and transmits data received after the DFP to the FFT unit 870.

The TGM 850 generates its own clock information through a signal periodically received from the DPM 840, and provides a reference time value to the DTPA calculation module 860. The DTPA calculation module 860 calculates a difference value DTPA (or Δ) between a DFP arrival time of the current serving BS, estimated based on the reference time information provided from the TGM 850, and a DFP arrival time of a new BS, supplied by the DPM 840.

The difference value is supplied to the MAC processor 820, and the MAC processor 820 transmits a scanning request message to the transmitter 830 and orders the DPM 840 to search for a new BS, in response to a new BS search request received from the DPM 840. Upon receiving the calculated DTPA value from the DTPA calculation module 860, the MAC processor 820 estimates an RTD value to the new BS based on the received DTPA value.

The transmitter 830 transmits the message received from the MAC processor 820 to the serving BS or the new BS.

Figure 9:
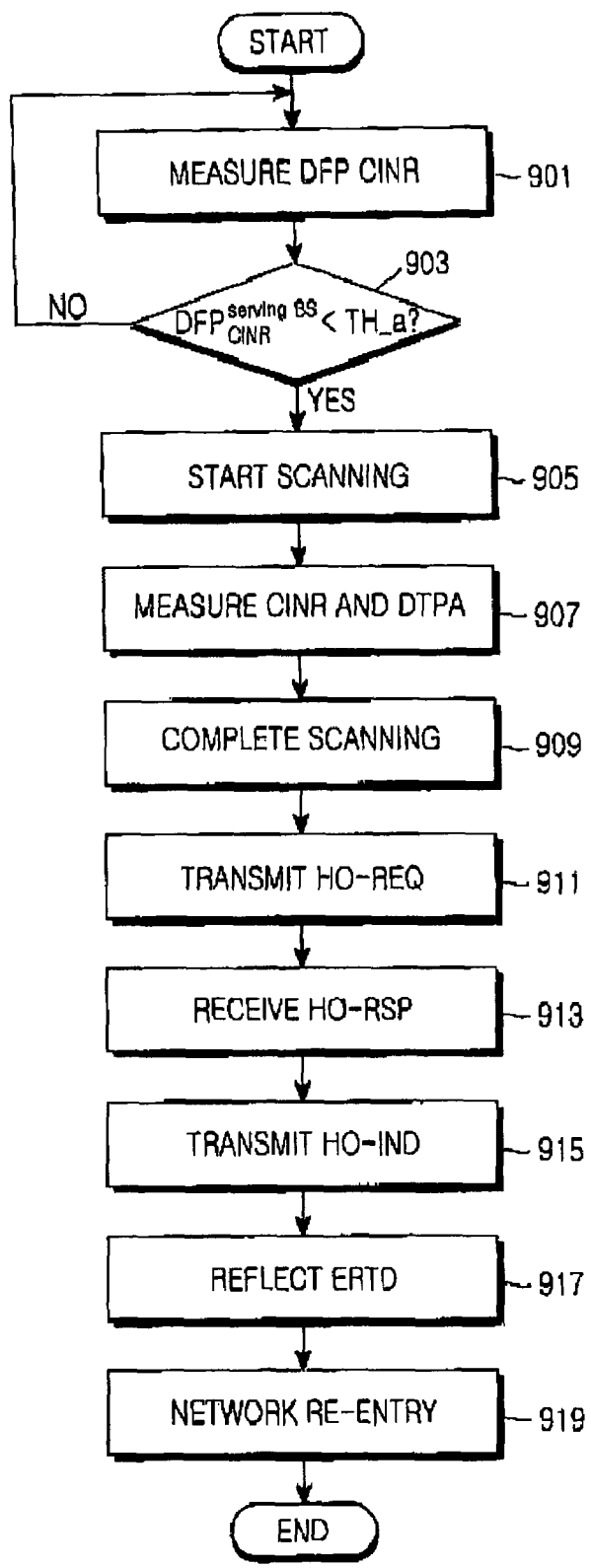
FIG. 9 is a flowchart illustrating a handover procedure performed by an SS according to an embodiment of the present invention.
Figure 10:
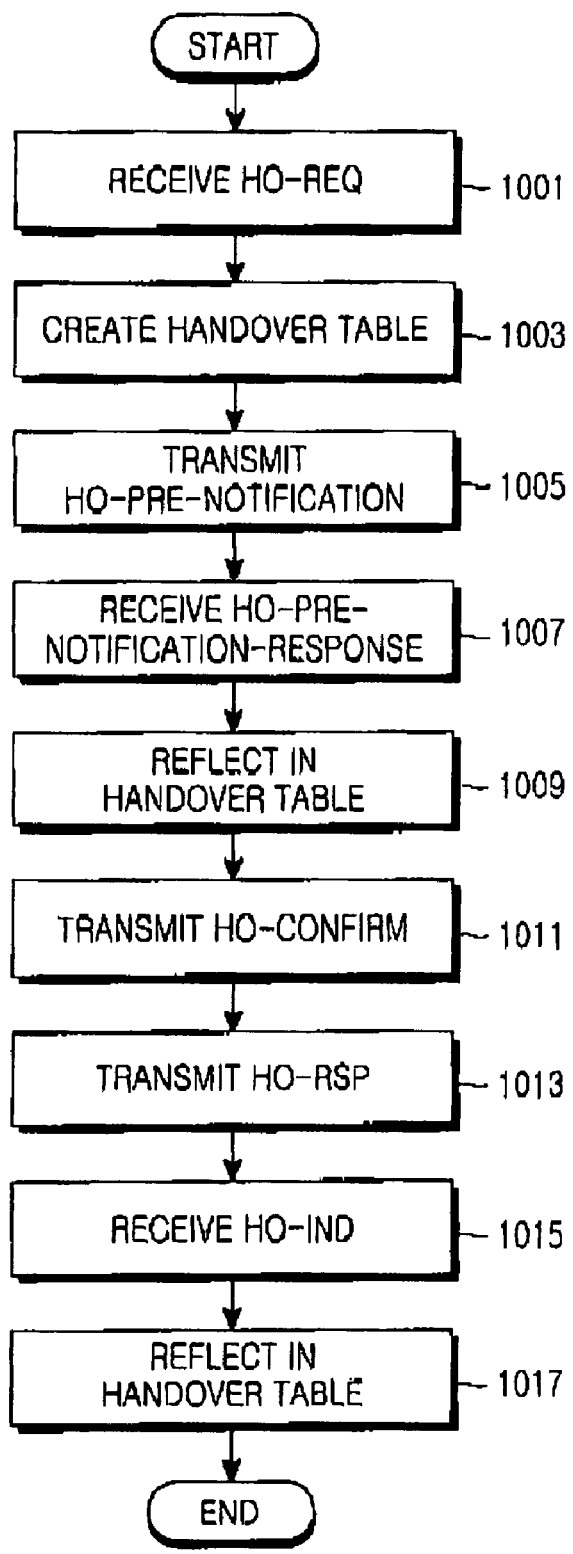
FIG. 10 is a flowchart illustrating a handover procedure performed by a serving BS according to an embodiment of the present invention.
Figure 11:
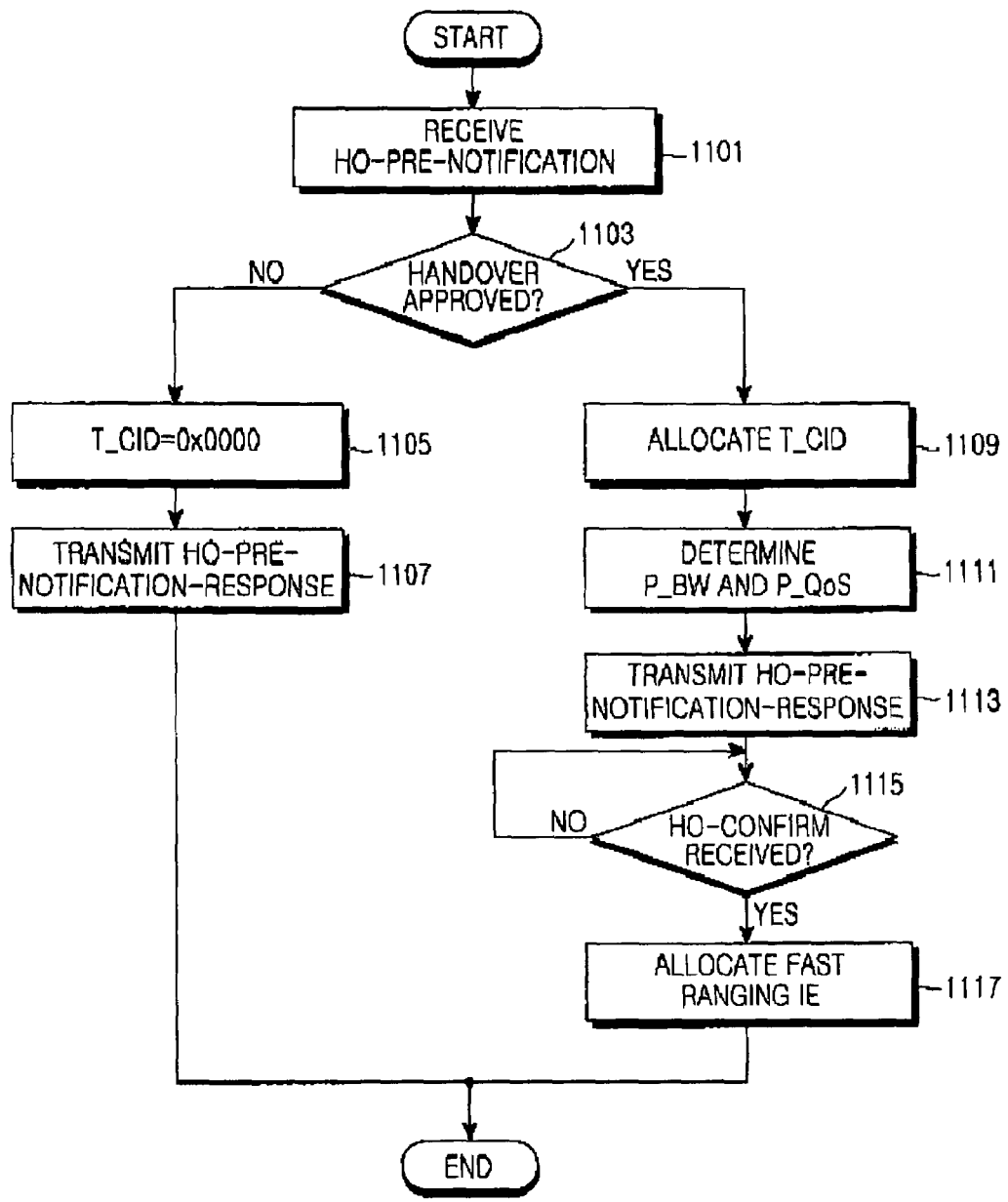
FIG. 11 is a flowchart illustrating a handover procedure performed by a target BS according to an embodiment of the present invention.

With reference to FIGS. 9 to 11, a description will now be made of handover procedures performed by an SS, a serving BS, and a target BS according to an embodiment of the present invention.

FIG. 9 is a flowchart illustrating a handover procedure performed by an SS according to an embodiment of the present invention. Referring to FIG. 9, the SS measures a CINR value of a DFP received from a serving BS every frame (Step 901). If the measured value $DFP_{CINR}^{serving\ BS}$ is less than a predetermined threshold TH_a (Step 903), the SS starts scanning for neighbor BSs (Step 905). In the scanning process, the SS detects DFP signals transmitted from the neighbor BSs, measures the CINR values of the DFP signals, and measures a DTPA value through the apparatus of FIG. 8 (Step 907).

Thereafter, the SS completes the scanning for all of the neighbor BSs notified by the serving BS (Step 909), and then sets the BSs to which it will consider a handover. The method of setting the BSs to which a handover will be considered can be implemented in several manners. In the present invention, the SS generates an HO-REQ message by including therein an BS ID, CINR and DTPA of each BS, considering only the BSs whose CINR values measured for the scanning process are greater than the threshold, and then transmits the HO-REQ message to the serving BS (Step 911). However, the present invention is not limited to this method, and can use several other methods for setting target BSs.

The SS transmits an expected time required for handover along with the HO-REQ message. Thereafter, the SS receives an HO-RSP message from the serving BS (Step 913). The SS detects a temporary CID allocated by a target BS, included in the HO-RSP message. Thereafter, the SS transmits an HO-IND message back to the serving BS (Step 915). Finally, the SS shifts an uplink transmission time to the selected target BS by an ERTD value (Step 917), and performs a network re-entry process for handover (Step 919).

FIG. 10 is a flowchart illustrating a handover procedure performed by a serving BS in response to a handover request from an SS according to an embodiment of the present invention. Referring to FIG. 10, the serving BS receives an HO-REQ message from a particular SS (Step 1001). The HO-REQ message includes an estimated handover time (EHOT) considered by the SS for handover, and related information (CINR, DTPA and ERTD) of candidate target BSs.

Upon receiving the HO-REQ message, the serving BS constructs a handover table using the HO-REQ message-related information (Step 1003). The handover table is illustrated in Table 5, and the serving BS can be implemented so as to manage the HO-REQ message-related information with the handover table illustrated in Table 5 (Step 1009).

TABLE 5

|  |  | BSs | | | | |
|---|---|---|---|---|---|---|
| MSS |  | BS#1 | BS#2 | ... BS#i | ... | BS#n |
| MSS#1 | CINR | CINR_1-1 |  | ... CINR_1-i | ... |  |
|  | ERTD | ERTD_1-1 |  | ... ERTD_1-i | ... |  |
|  | P_BW |  |  | ... | ... |  |
|  | P_QoS |  |  | ... | ... |  |
|  | T_CID |  |  | ... | ... |  |
|  | SLP |  |  | ... | ... |  |
|  | R_BW |  |  | R_BW_1 |  |  |
|  | R_QoS |  |  | R_QoS_1 |  |  |
|  | EHOT |  |  | EHOT_1 |  |  |
|  | Target BS |  |  |  |  |  |

TABLE 5-continued

| MSS | BSs | | | |
|---|---|---|---|---|
| | BS#1 | BS#2 | ... BS#i | ... BS#n |
| ... ... | ... | ... | ... ... | ... ... |
| MSS#m CINR | CINR_m-1 | CINR_m-2 | ... | ... CINR_m-n |
| ERTD | ERTD_m-1 | ERTD_m-2 | ... | ... ERTD_m-n |
| P_BW | | | ... | ... |
| P_QoS | | | ... | ... |
| T_CID | | | ... | ... |
| SLP | | | ... | ... |
| R_BW | | R_BW_m | | |
| R_QoS | | R_QoS_m | | |
| EHOT | | EHOT_m | | |
| Target BS | | | | |

As illustrated in Table 5, the handover table writes therein information included in the HO-REQ message and an information element that should be collected through the succeeding operations, by enumerating neighbor BSs of the serving BS in a horizontal axis and enumerating SSs that transmitted the HO-REQ message in a vertical axis.

With reference to Table 5, a description will now be made of an SS#1 that considers a handover to neighbor BSs BS#1 to BS#i through the HO-REQ message.

The SS#1 includes an estimated handover time EHOT_1 and CINR_1-1/ERTD_1-1 to CINR_1-i/ERTD_1-i of BS#1 to BS#i, selected through scanning, in an HO-REQ message, and transmits the HO-REQ message to a serving BS, and the serving BS writes the received information in the handover table illustrated in Table 5. Further, the serving BS analyzes SS#1's requiring Bandwidth (R_BW_1) indicating a bandwidth required by the SS#1 and SS#1's requiring QoS (R_QoS_1) indicating a quality-of-service (QoS) required by the SS#1 based on the information written by the SS#1, and writes the R_BW_1 and R_QoS_1 in R_BW and R_QoS fields of Table 5. In the same manner, the serving BS writes HO-REQ information received from another SS in the handover table of Table 5.

Thereafter, the serving BS attempts communication with the neighbor BSs in order to complete its own handover table. The serving BS managing the handover table of Table 5 first transmits an HO-pre-Notification (i.e., HO-Notification) message to a BS#1 (Step 1005), and the HO-pre-Notification message includes ID (MAC address)/EHOT_1/ERTD_1-1/ R_BW_1/R_QoS_1 to ID (MAC address)/EHOT_m/ ERTD_1-m/R_BW_m/R_QoS_m of the SS#1 to an SS#m. In addition, the serving BS includes the foregoing information in the HO-pre-Notification message, and transmits the HO-pre-Notification message to a BS#2 to a BS#n (Step 1005).

After transmitting the HO-pre-Notification message, the serving BS receives an HO-pre-Notification.Response (i.e., HO-Notification.Response) message from the neighbor BSs (Step 1007), and the HO-pre-Notification.Response message includes information on SSs included in the HO-pre-Notification message. The information includes a provided Bandwidth (P_BW), a provided QoS (P_QoS), and a temporary CID (T_CID), which can be provided to the SS by the BS that transmitted the HO-pre-Notification.Response message. If the T_CID value is 0x0000, it means that the BS that transmitted the HO-Notification.Response message cannot accept the SS.

Thereafter, the serving BS reflects the information included in the HO-pre-Notification message in the handover table (Step 1009). Based on the reflected information, the serving BS determines a service level prediction (SLP) value indicating a predicted service level at which a neighbor BS can provide a service to a corresponding SS. Subsequently, the serving BS determines the BSs that can provide appropriate SLP values for the SS that requested the handover, and transmits an HO-Confirm message to the determined BSs (Step 1011), thereby notifying the BS receiving the HO-Confirm message that the SS will perform the handover thereto.

The serving BS includes information (BS ID and SLP) related to the BS that transmitted the HO-Confirm message in an HO-RSP message, and transmits the HO-RSP message to the corresponding SS (Step 1013). If the serving BS receives an HO-IND message in response to the transmitted HO-RSP message (Step 1015), it reflects final target BS information included in the HO-IND message in the handover table of Table 5 (Step 1017), thus completing the procedure.

FIG. 11 is a flowchart illustrating a handover procedure performed by a target BS in response to a handover request from an SS according to an embodiment of the present invention. Referring to FIG. 11, the target BS receives an HO-pre-Notification message from a serving BS (Step 1101), starting a handover procedure. Based on SS information included in the HO-pre-Notification message, the target BS determines if it can approve the handover requested by the SS (Step 1103).

If the target BS can approve the handover, the target BS determines a temporary CID (T_CID=a value except 0x0000) to be allocated to the corresponding SS (Step 1109), and determines P_BW and P_QoS that can be provided to the SS (Step 1111). Subsequently, the target BS includes the determined information in an HO-pre-Notification.Response message, and transmits the HO-pre-Notification.Response message to the serving BS that transmitted the HO-pre-Notification message (Step 1113). Thereafter, if the target BS receives an HO-Confirm message from the serving BS (Step 1115), the target BS allocates a Fast Ranging IE for fast ranging to an SS included in the HO-Confirm message (Step 1117).

Here, the target BS reflects an ERTD of the SS provided through the HO-pre-Notification message according to an embodiment of the present invention instead of allocating a Fast Ranging IE so that it can accept the maximum RTD based on its cell coverage, thereby allocating the interval with high resource efficiency.

However, if the target BS cannot accept the handover request of the SS notified through the HO-pre-Notification message, the target BS sets the temporary CID T_CID to 0x0000 (Step 1105), and transmits the HO-pre-Notification.

Response message including the T_CID information (Step 1107), denying the handover request.

As described above, the present invention allows an BS allocating an Fast Ranging IE for fast ranging to use a 16-bit CID instead of a 48-bit MAC address of a corresponding SS, thereby increasing the efficiency of the radio resources. In addition, an IIR method according to an embodiment of the present invention allows, in a scanning process, an SS to receive only a DFP of a new BS and notify the new BS of an RTD value to the new BS, which can be estimated based on the DFP, via a serving BS, thereby minimizing scanning overhead and delay, and enabling a target BS to perform Fast Ranging IE allocation with high resource efficiency.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing a handover by a subscriber station (SS) in a broadband wireless communication system including a serving base station (BS) communicating with the SS, and at least one neighbor BS neighboring the serving BS, the method comprising the steps of:
   receiving downlink signals from the serving BS and the neighbor BS;
   measuring an arrival time difference between the downlink signal received from the serving BS and the downlink signal received from the neighbor BS;
   transmitting a handover request message including the measured arrival time difference to the serving BS; and
   receiving fast ranging information from the neighbor BS through a message in which the arrival time difference is reflected.

2. The method of claim 1, wherein the arrival time difference is a value used for compensating for a round trip delay (RTD) caused by signal transmission/reception between the selected BS and the SS located in a distance from the serving BS.

3. The method of claim 2, wherein the round trip delay (RTD_BS2) is estimated using an RTD (RTD_BS1) of the downlink signal from the serving BS and the arrival time difference (DTPA: Difference Time of downlink frame Preamble Arrival) between the downlink signal from the serving BS and the downlink signal from the neighbor BS in accordance with $$RTD\_BS2=RTD\_BS1+2DTPA.$$

4. A method for performing a handover by a subscriber station (SS) from a serving base station (BS) to a target BS selected from a plurality of neighbor BSs in a broadband wireless communication system including the serving BS communicating with the SS, and the plurality of neighbor BSs neighboring the serving BS, the method comprising the steps of:
   measuring a arrival time difference of a downlink signal received from the target BS relative to a downlink signal received from the serving BS;
   estimating a round trip delay between the SS and the neighbor BS using the measured arrival time difference;
   transmitting to the serving BS a handover request message including the estimated round trip delay;
   receiving from the target BS a fast ranging information element adjusted by the estimated round trip delay; and
   performing initial ranging for handover to the target BS upon receiving the fast ranging information element.

5. The method of claim 4, wherein the arrival time delay of the downlink signal received from the target BS relative to the downlink signal received from the serving BS is a value used for compensating for the round trip delay (RTD) caused by signal transmission/reception between the target BS and the SS located in a distance from the serving BS.

6. The method of claim 4, wherein the round trip delay (RTD_BS2) to the target BS is calculated by reflecting the arrival time difference (DTPA: Difference Time of downlink frame Preamble Arrival) between the serving BS and the target BS in an RTD value (RTD_BS1) between the SS and the serving BS in accordance with $$RTD\_BS2=RTD\_BS1+2DTPA.$$

7. The method of claim 6, wherein the RTD to the target BS is used as for time correction reflected by the SS during signal transmission to the target BS, through an initial ranging between the SS and the target BS.

8. The method of claim 4, further comprising the steps of:
   receiving a handover response message including a temporary connection identifier (CID) allocated to the SS from the serving BS in response to handover request message after transmitting the handover request message;
   receiving a fast ranging information element from the target BS upon determining handover to the target BS; and
   performing initial ranging with the target BS through the temporary CID upon receiving the fast ranging information element.

9. The method of claim 8, further comprising the steps of:
   recognizing, by the target BS, the SS through a handover notification message transmitted from the serving BS; and
   allocating, by the target BS, a corresponding temporary CID to the recognized SS, and transmitting to the serving BS a handover notification response message including the temporary CID,
   wherein the serving BS transmits the temporary CID received from the target BS to the SS through the handover response message.

10. The method of claim 8, wherein the temporary CID is a CID temporarily used by the SS to perform an initial ranging to the target BS and is comprised of 16 bits.

11. The method of claim 8, wherein the target BS withdraws the temporary CID if there is no traffic connection using the allocated temporary CID until a predetermined time.

12. A method for performing a handover by a subscriber station (SS) from a serving base station (BS) to a target BS selected from a plurality of neighbor BSs in a broadband wireless communication system including the serving BS communicating with the SS, and the plurality of neighbor BSs neighboring the serving BS, the method comprising the steps of:
   estimating a round trip delay (RTD) value to the target BS based on an RTD value to the serving BS and a signal arrival time difference between a signal received from the serving BS and a signal received from the target BS;
   transmitting the estimated RTD value to the target BS to the serving BS; and
   determining to perform a handover to the target BS, and receiving from the target BS a message including an allocated fast ranging information element and the estimated RTD value.

13. The method of claim 12, wherein the RTD value to the target BS is calculated by $$RTD\_BS2 = RTD\_BS1 + 2DTPA$$

where RTD_BST denotes an RTD value to the target BS, RTD_BS1 denotes an RTD value to the serving BS, and DPTA denotes an arrival time difference between a signal received from the service BS and a signal received from the target BS.

14. The method of claim 12, wherein the signals received from the serving BS and the target BS, and used to calculate the arrival time difference, are downlink frame preamble (DFP) signals.

15. The method of claim 12, wherein after transmitting a handover request message including the signal arrival time difference to the serving BS, the SS receives from the serving BS a handover response message including a temporary connection identifier (CID) allocated by the target BS.

16. The method of claim 15, wherein the SS performs an initial ranging with the target BS using the allocated temporary CID.

17. The method of claim 15, wherein the temporary CID is a CID temporarily used by the SS to perform an initial ranging to the target BS and is comprised of 16 bits.

18. The method of claim 15, wherein the target BS withdraws the temporary CID if there is no traffic connection using the allocated temporary CID until a predetermined time.

19. The method of claim 12, wherein upon receiving the allocated fast ranging information element, the SS performs fast ranging with the target BS through the allocated fast ranging information element.

* * * * *

UNITED STATES PATENT AND TRADEMARK OFFICE
CERTIFICATE OF CORRECTION

PATENT NO. : 7,613,148 B2　　　　　　　　　　　　　　　　　　　　　Page 1 of 1
APPLICATION NO. : 11/057887
DATED : November 3, 2009
INVENTOR(S) : Hong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 923 days.

Signed and Sealed this

Fourteenth Day of December, 2010

David J. Kappos
*Director of the United States Patent and Trademark Office*